US008639600B2

(12) United States Patent
Lee (10) Patent No.: US 8,639,600 B2
(45) Date of Patent: Jan. 28, 2014

(54) MOBILE PAYER AUTHENTICATION

(75) Inventor: Timothy Mu-Chu Lee, San Jose, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 603 days.

(21) Appl. No.: 12/538,649

(22) Filed: Aug. 10, 2009

(65) Prior Publication Data
US 2010/0082486 A1    Apr. 1, 2010

Related U.S. Application Data

(60) Provisional application No. 61/087,801, filed on Aug. 11, 2008.

(51) Int. Cl.
*G06Q 40/00* (2012.01)
(52) U.S. Cl.
USPC ............................................... 705/35; 705/44
(58) Field of Classification Search
USPC ...................................................... 705/35, 44
See application file for complete search history.

(56) References Cited

U.S. PATENT DOCUMENTS

| | | | |
|---|---|---|---|
| 2001/0021929 A1* | 9/2001 | Lin et al. ............................ | 707/2 |
| 2002/0181710 A1 | 12/2002 | Adam et al. | |
| 2003/0200184 A1* | 10/2003 | Dominguez et al. ............ | 705/78 |
| 2004/0019564 A1 | 1/2004 | Goldthwaite et al. | |

FOREIGN PATENT DOCUMENTS

| | | |
|---|---|---|
| KR | 10-2000-0049648 | 8/2000 |
| KR | 10-2004-0060909 | 7/2004 |
| KR | 10-2005-0009772 | 1/2005 |

OTHER PUBLICATIONS

Savage, Marcia; "RSA puts spotlight on security"; CRN; Feb. 18, 2002.*
M2_Presswire; "Leading IT infrastructure companies to support open mobile architecture initiative to drive mobile software and services marker"; Coventry; Dec. 18, 2001.*

* cited by examiner

*Primary Examiner* — Edward Chang
(74) *Attorney, Agent, or Firm* — Kilpatrick Townsend & Stockton LLP (57) ABSTRACT

An address of a computing device for conducting a transaction with a merchant on an account of an account holder is used to obtain display attributes of the computing device. An authentication request is formatted using the obtained display attributes of the computing device. The formatted authentication request is sent for delivery to the logical address of the computing device. In response to the formatted authentication request, authentication information for the account holder is received from the logical address of the computing device. A validation attempt is performed on the received authentication information for the account holder. If the received authentication information for the account holder was successfully validated by the performance of the validation attempt, the authentication response is transmitted for delivery to a logical address for the merchant.

15 Claims, 6 Drawing Sheets

Prior Art

MOBILE PAYER AUTHENTICATION

CROSS-REFERENCE TO RELATED APPLICATIONS

The application claims priority to U.S. Provisional Application Ser. No. 61/087,801, titled "Remote Mobile Payments," filed on Aug. 11, 2008, which is incorporated herein by reference.

FIELD

The invention is related to a payment processing system in which a transaction between a merchant and a consumer conducted on an account issued by an issuer, where the transaction is acquired from the merchant by an acquirer for collection on the account from the issuer through a transaction handler or transaction processor.

BACKGROUND

During a transaction using a transaction card, such as a credit card, a debit card, a stored value card, a bank card, a loyalty card, a smart card and/or the like, it is important to verify a cardholder's ownership of an account to avoid a variety of problems, such as unauthorized use. Cardholder authentication is the process of verifying that the account is owned by the cardholder. For example, cardholder authentication during a "card present" transaction is performed when a merchant's representative verifies that the signature on a transaction card matches the cardholder's signature on a receipt.

Technological improvements have allowed businesses and individuals to engage in transactions in a plurality of environments. For example, cardholders can engage in traditional "in person" transactions, transactions via the internet, transactions over the telephone and transactions through mail systems. In many cases, cardholders desire the convenience of performing transactions without having to directly visit a service provider. In doing so, the cardholder may seek to eliminate transportation time and reduce the hassle associated with, for example, shopping in a retail environment or waiting in line at a bank by performing these transactions from the privacy of their own home.

"Card Not Present" ("CNP") transaction volumes are increasing at least in part because of such convenience provided to cardholders and the extra sales provided to merchants. However, as CNP transaction volume increase, fraudulent transactions and the monetary losses due to such transactions are increasing as well.

Figure 1:
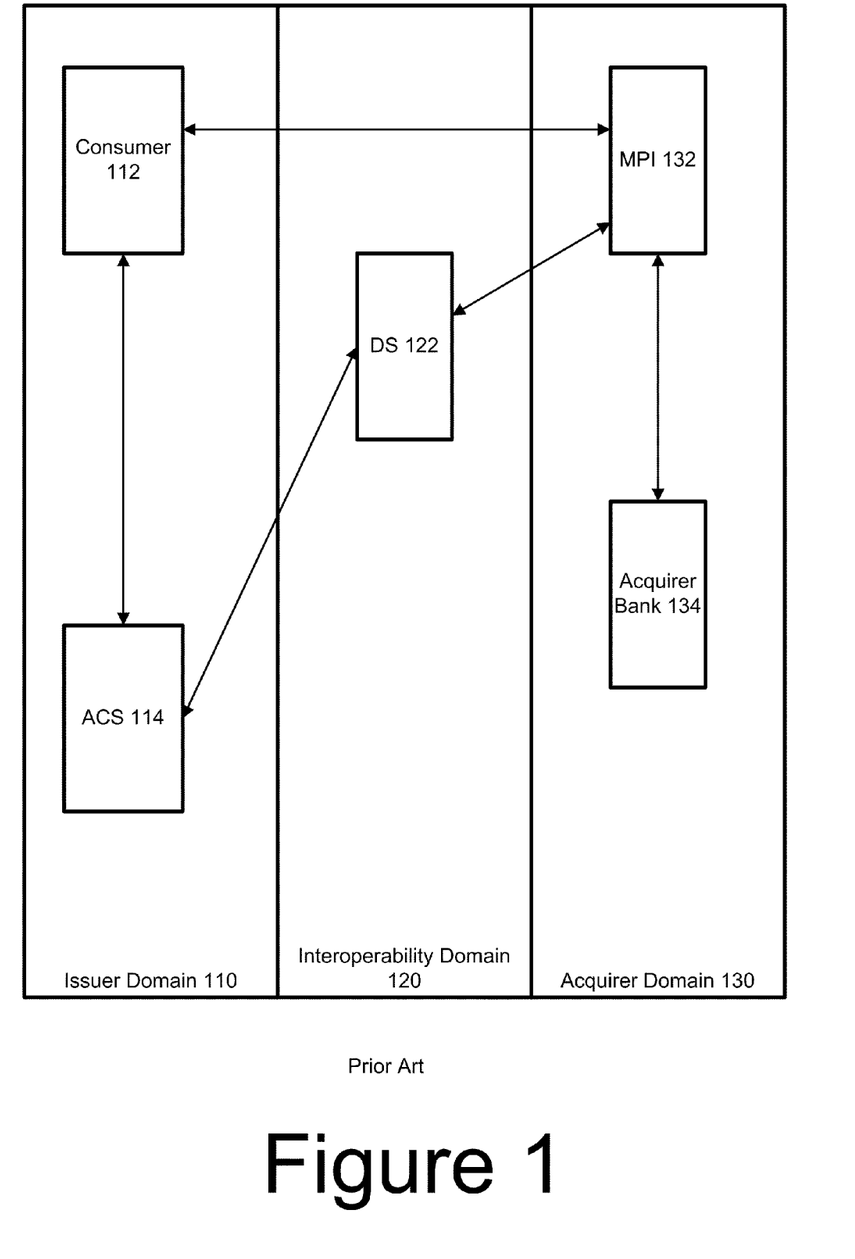
FIG. 1 depicts a system diagram for a conventional transaction processing system according to the prior art.

FIG. 1 depicts a system diagram for a conventional transaction processing system according to the prior art. As shown in FIG. 1, a transaction processing system is logically divided into an issuer domain 110, an interoperability domain 120 and an acquirer domain 130. The issuer domain 110 includes a consumer 112 and an access control server 114 ("ACS"). The interoperability domain 120 includes a directory server 122 ("DS"). The acquirer domain 130 includes a merchant purchase interface 132 ("MPI") and an acquirer bank 134. The lines represent data transfers performed between the connected entities. Such data transfers are described more fully below in reference to FIG. 2.

Figure 2:
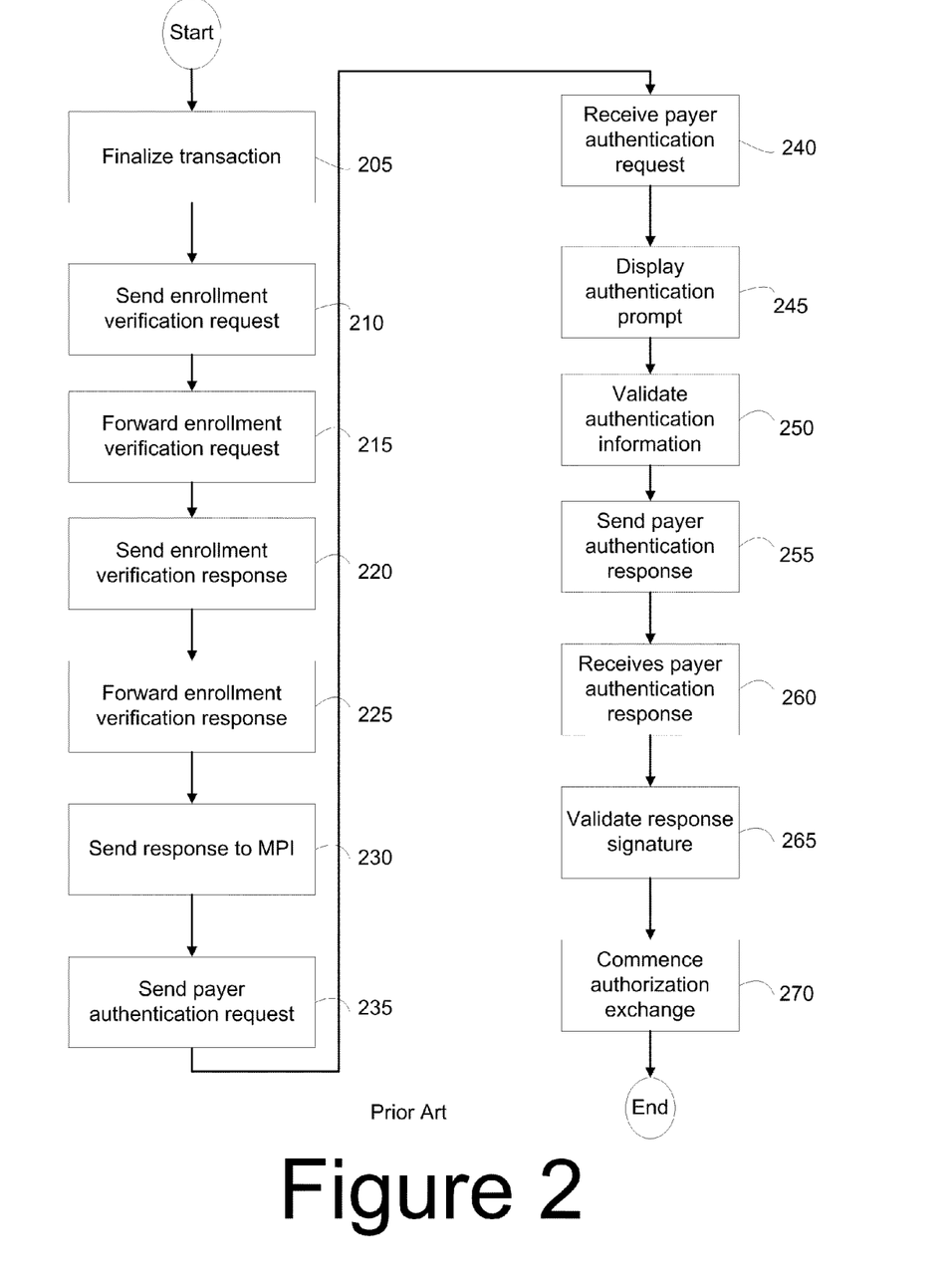
FIG. 2 depicts a flow diagram for a conventional CNP transaction flow according to the prior art.

FIG. 2 depicts a conventional CNP transaction flow according to the prior art. As shown in FIG. 2, a consumer adds items to a shopping cart and finalizes 205 a transaction. The MPI 132 sends 210 an enrollment verification request to a DS 122 to verify enrollment of the consumer 112 in the authentication service. If the consumer 112 is enrolled in the authentication service, the DS 122 forwards 215 the enrollment verification request to the ACS 114. The ACS 114 responds 220 to the DS 122 with an enrollment verification response indicating whether authentication is available for the consumer's card. The DS 122 then forwards 225 the enrollment verification response to the MPI 132. If the consumer is participating in the authentication service, the DS 122 creates and sends 230 a response to the MPI 132.

If card authentication is available, the MPI 132 sends 235 a request for payer authentication to the ACS 114 via the consumer's internet browser 112. The ACS 114 receives 240 the payer authentication request. The ACS 114 then displays 245 a window to the consumer displaying payment details such as, for instance, a merchant name, merchant location, total cost, purchase date and card number. The window also prompts the cardholder for the cardholder's authentication information, such as a password, personal identification number, or chip cryptogram. After the consumer enters submits the authentication information, the ACS 114 validates 250 the consumer's authentication information. If the consumer's authentication information is valid, the ACS 114 generates and sends 255 a payer authentication response to the MPI 132 in response to the payer authentication request, thereby authenticating the consumer 112. The ACS 114 may digitally signs the payer authentication request. The MPI 132 then receives 260 the payer authentication response and validates 265 the response signature if the response signature was signed by the ACS 114. The MPI 132 then commences 270 an authorization exchange with its acquirer 134.

When the consumer is using an internet enabled cellular telephone, the above-referenced and method may be inadequate. Thus, there is a need for solutions to the inadequacies

SUMMARY

An address of a computing device is received. The address is used to access display attributes of a display on the computing device. An authentication request is formatted using the obtained display attributes and is sent to computing device. In response to the, authentication information for an account holder is received from the computing device. A validation attempt is performed on the received authentication information for the account holder. If the received authentication information for the account holder was successfully validated, the authentication response is transmitted for delivery to a merchant with whom the account holder is conducting a transaction with the merchant upon an account of the account holder by use of the computing device. In another implementation, the foregoing computing device is a cellular telephone having address is its telephone number, where the cellular telephone is enable to conduct the transaction as an e-commerce transaction with a web site of the merchant over the internet.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

In one implementation, there is received a logical address of a computing device having a display with display attributes. The computing device is being used to conduct a transaction and the logical address is received while the transaction being conducted by a merchant upon an account of an account holder. Display attributes of the display of the computing device are obtained by accessing, using at least the logical address of the computing device, a database stored on a network device of the network. An authentication request is formatted using the obtained display attributes of the computing device. The formatted authentication request is sent for delivery to the logical address of the computing device. In response to the formatted authentication request, authentication information for the account holder is received from the logical address of the computing device. A validation attempt is performed on the received authentication information for the account holder. If the received authentication information for the account holder was successfully validated by the performance of the validation attempt, the authentication response is transmitted for delivery to a logical address for the merchant.

In a variation of the foregoing implementation, if the received authentication information for the account holder was successfully validated by the performance of the validation attempt, the authentication response is digitally signed. The, the authentication response that is transmitted for delivery to the logical address is a digitally signed authentication response In another variation of the foregoing implementation, the computing device is a cellular telephone whose logical address is a cellular telephone number. In yet another variation, a transmission is received containing information confirming the authorization of the transaction by the issuer of the account. A message is formatted, using the obtained display attributes of the computing device, to contain the information confirming the authorization of the transaction by the issuer of the account. The formatted message is transmitted for delivery to the logical address of the computing device.

In another implementation, there is received, at one of a plurality of network devices on a network, from a logical address of an e-commerce website of a merchant, incident to an e-commerce transaction being conducted by the merchant upon an account of an account holder: (i) a telephone number of a web enabled cellular telephone having a display with display attributes that is being used to conduct the e-commerce transaction; and (ii) an enrollment verification request.

In response to the enrollment verification request, a verification is made that the account and the web enabled cellular telephone are both enrolled in an authentication service. A verification that the account and the web enabled cellular telephone are both enrolled in the authentication service is transmitted for delivery to the logical address of the e-commerce website of the merchant. There is thereafter received, in response to the verification that the account and the web enabled cellular telephone are both enrolled in the authentication service, at one of the plurality of network devices on the network: (i) the telephone number of the web enabled cellular telephone; (ii) an identifier for the merchant; (iii) a total currency amount for the transaction; and (iv) an identifier for the account. The display attributes of the display of the web enabled cellular telephone are obtained by accessing a display attributes database using at least the telephone number of the web enabled cellular telephone. An authentication request is formatted using the obtained display attributes of the display of the web enabled cellular telephone. The formatted authentication request is transmitted for delivery to the telephone number of the web enabled cellular telephone. The formatted authentication request includes: (i) an identifier for the merchant; (ii) the total currency amount of the transaction; and (iii) an identifier for the account. Authentication information for the account holder that includes an access code is received from the telephone number of the web enabled cellular telephone in response to the formatted authentication request. A validation attempt is made using at least the access code on the received authentication information for the account holder. If the received authentication information for the account holder was successfully validated by the performance of the validation attempt, then the authentication response is digitally signed and transmitted for delivery to the logical address of the e-commerce website of the merchant from one of the plurality of network devices on the network. As such, an authorization request for the transaction being conducted on the account can be sent to an acquirer for the merchant that identifies the received authentication information for the account holder as being successfully validated.

In a variation of the foregoing implementation, the display attributes of the display of the web enabled cellular telephone can be a mark-up language and a character set supported by the web enabled cellular telephone. In another variation, the can be received, at one of the plurality of network devices on the network, a transmission containing information confirming the authorization of the transaction by the issuer of the account. A message can be formatted using the obtained display attributes of the web enabled mobile computing device and containing data representing the confirmation of the authorization of the transaction by the issuer of the account. The formatted message can then be transmitted, from one of the plurality of network devices on the network, for delivery to the logical address of the web enabled mobile computing device.

Figure 3:
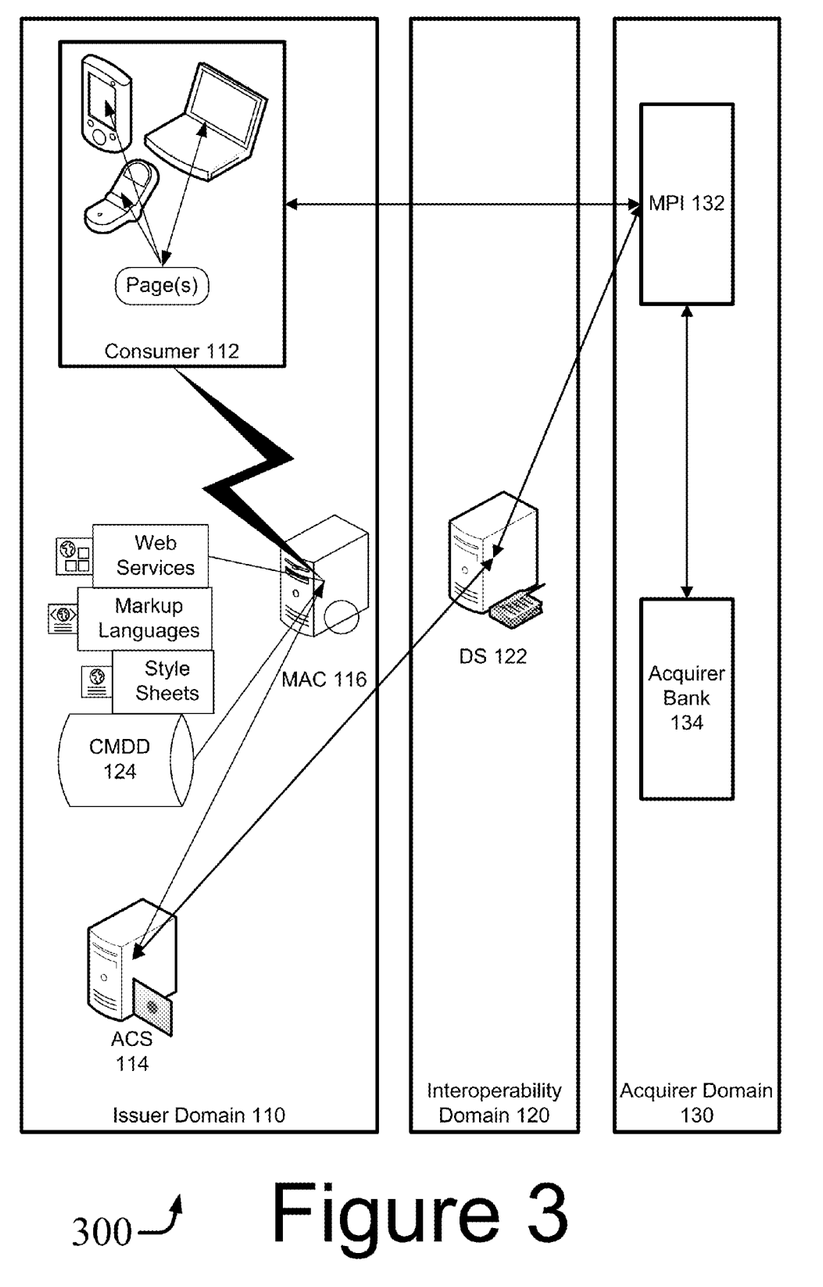
FIG. 3 depicts a system diagram for an exemplary transaction processing system according to an embodiment.

FIG. 3 depicts a system diagram for an exemplary transaction processing system according to an embodiment. A system according to a preferred embodiment comprises a consumer 112, MPI 132, DS 122, ACS 114, Acquirer Bank 134, and mobile authentication component (MAC) 116. The MAC 116 further comprises a Consumer Mobile Device database (CMDD) 124 contains information allowing the MAC 116 to determine a mobile device's supporting mark-up languages and character sets based upon the mobile device's number.

Figure 4:
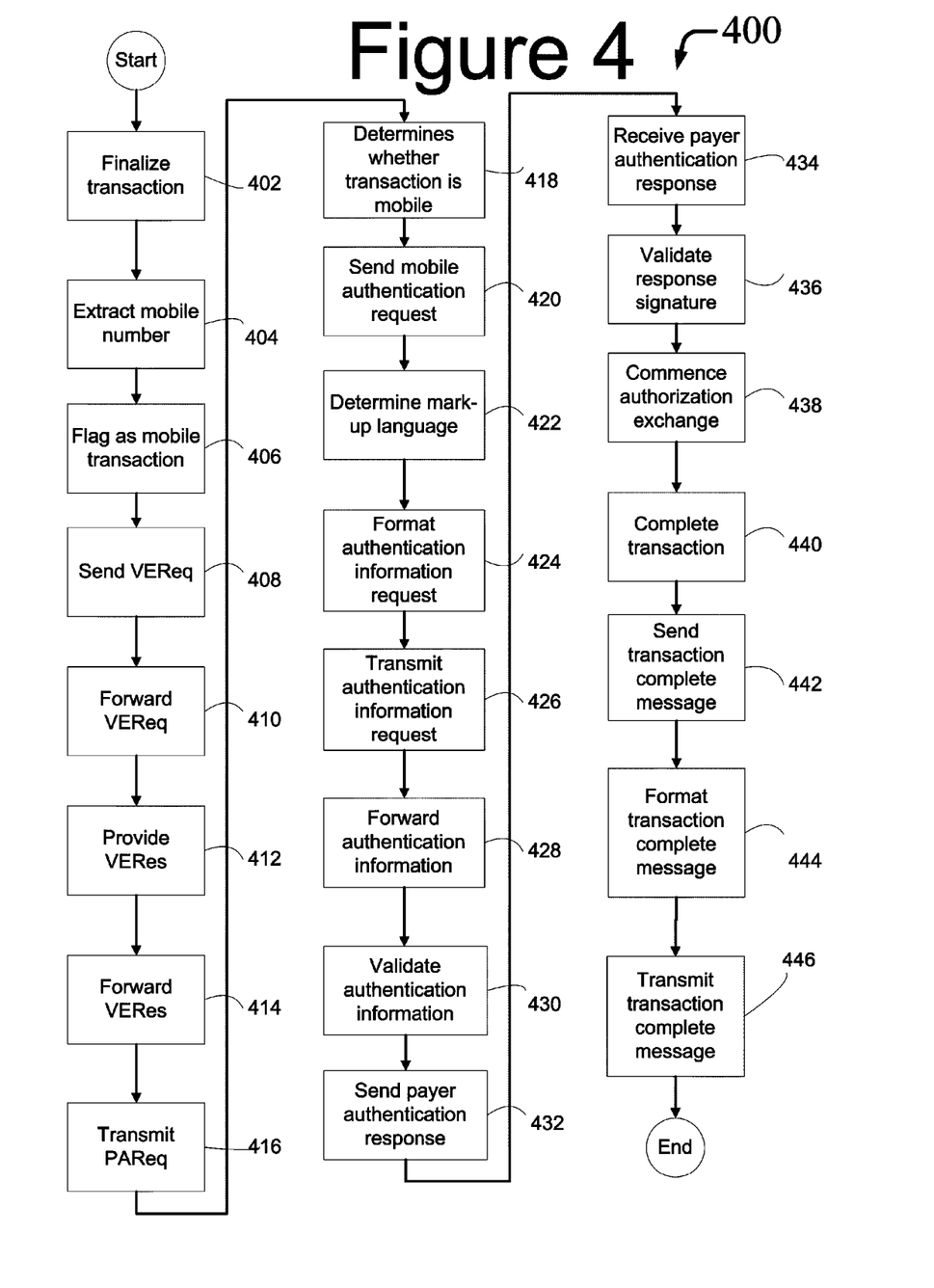
FIG. 4 depicts a flow diagram for an exemplary transaction flow according to an embodiment.

FIG. 4 depicts a flow diagram for an exemplary transaction flow 400 using a mobile internet device according to an embodiment. As shown in FIG. 4, a consumer may select one or more items for purchase via an MPI 132 and finalize 402 purchased items. The MPI 132 may then extract 404 the consumer's mobile number from the internet message headers of messages sent to the MPI 132 by the consumer 112. The MPI 132 may then flag 406 the transaction as a mobile transaction. The MPI 132 may transmit 408 an enrollment verification request ("VEReq") to a DS 122 so that the MPI 132 may verify enrollment of the consumer 112 in an authentication service. The VEReq should include the consumer's mobile number and the mobile transaction flag. If the consumer is enrolled in the authentication service, the DS 122 may forward 410 the VEReq to an appropriate ACS 114. The VEReq should still, of course, include the consumer's mobile number and the mobile transaction flag. The ACS 114 may provide 412 an enrollment verification response ("VERes") to the DS 122 that indicates whether authentication is available for the consumer's cellular telephone and account upon which the transaction is to be conducted with the merchant. The DS 122 may then forward 414 the VERes provided by the ACS 114 to the MPI 132.

If authentication is available for the consumer's cellular telephone, the MPI 132 may transmit 416 a payer authentication request ("PAReq") to the ACS 114 via the DS 122. The ACS 114 then determines 418 whether the transaction is a mobile transaction by reviewing the mobile transaction flag.

Once the ACS 114 has determined that the transaction is a mobile transaction, the ACS 114 may send 420 a mobile authentication request to the MAC 116. The mobile authentication request should include at least the consumer's mobile number. In a preferred embodiment, the mobile authentication request also includes a merchant name, merchant location, total cost, purchase date and card number. The MAC 116 then determines 422 the mark-up language and character set supported by the customer's mobile device by accessing the CMDD 124 using the consumer's mobile number. The MAC 116 then formats 424 an authentication information request to the consumer using the consumer's mobile device's supported mark-up language and character set. The MAC 116 may then transmit 426 the authentication information request to the consumer. The authentication information request may prompt the cardholder for the cardholder's authentication information, such as a password, personal identification number, or chip cryptogram.

The authentication information request may further display payment details such as, for instance, a merchant name, merchant location, total cost, purchase date and card number. After a consumer submits the authentication information to the MAC 116, the MAC 116 may forward 428 the authentication information to the ACS 114. The ACS 114 may then validate 430 the consumer's authentication information. If the consumer's authentication information is valid, the ACS 114 generates and sends 432, in response to the payer authentication request, a payer authentication response to the MPI 132 (through the DS 122), thereby authenticating the consumer 112.

The ACS 114 may digitally sign the payer authentication request. The MPI 132 then receives 434 the payer authentication response and validates 436 the signature of the ACS 114 if the payer authentication response was signed by the ACS 114. The MPI 132 then commences 438 an authorization exchange with its acquirer 134 by sending an authorization request message to the acquirer 134.

The authorization exchange is complete when the acquirer 134 sends an authorization response message to MPI 132 indicating that the issuer of the account upon which the transaction is being conducted is an authorized transaction. Receipt by MPI 132 of the authorization of the transaction from the acquirer 134, the transaction may be completed 440. The ACS may send 442 a transaction complete message to the MAC 116 indicating that the transaction was successfully completed. The MAC 116 may format 444 the transaction complete message and transmit 446 the message to the consumer 112.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

Payment Processing System

Figure 5:
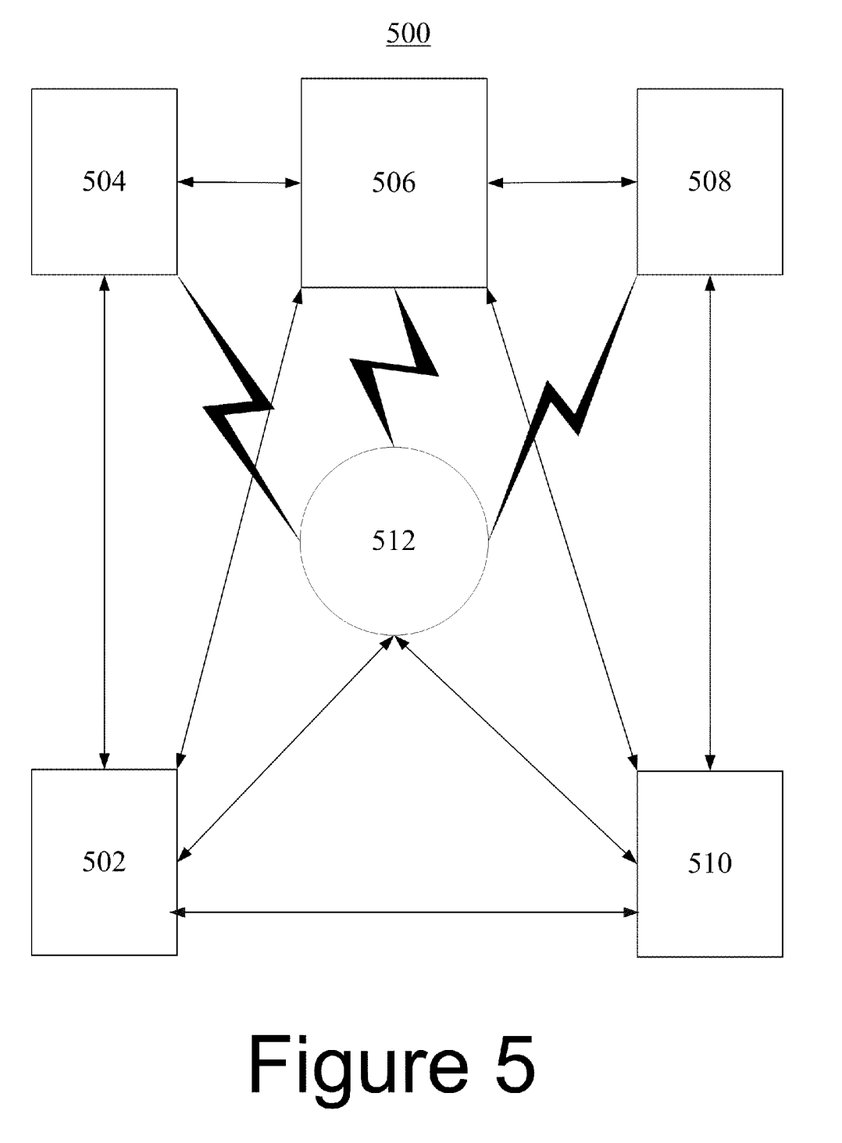
FIGS. 5-6 depicts exemplary payment processing systems for processing an acquired transaction conducted on an account issued to consumer with a merchant.

The Payment System illustrated in FIG. 5 depicts an exemplary process which can be used by the foregoing Implementations with respective modifications as described therein.

A transaction includes participation from different entities that are a component of a payment processing system 500 including an issuer 502, a transaction handler 504, such as a credit card company, an acquirer 506, a merchant 508, or a user 510 such as an account holder and/or consumer. The acquirer 506 and the issuer 502 can communicate through the transaction handler 504. Merchant 508 will be a person or entity that sells goods or services. Merchant 508 may utilize at least one Point-of-Service (POS) terminal that can communicate with the acquirer 506, the transaction handler 504, or the issuer 502. Thus, the POS terminal is in operative communication with the payment processing system 500.

Typically, a transaction begins with the user 510, such as an account holder or a consumer, wirelessly presenting a Consumer Portable Transaction Payment Device (CPTPD) 512, for instance an cellular telephone, a World Wide Web enabled mobile device, to merchant 508 to initiate an exchange for a good or service. The CPTPD 512 may include a volatile or non-volatile memory to store information such as an identifier for an account issued by the issuer 502 to the user 510 (e.g., the account holder), where the transaction is to be conducted upon the account.

Merchant 508 may use the POS terminal to obtain account information, such as an account number, from the CPTPD 512. The CPTPD 512 may interface with the POS terminal using a mechanism that may include a contactless system using a radio frequency and/or magnetic field recognition system. The POS terminal sends a transaction authorization request to the issuer 502 of the account. Alternatively, or in combination, the CPTPD 512 may communicate with the issuer 502, the transaction handler 504, or the acquirer 506.

The issuer 502 may authorize the transaction using the transaction handler 504. The transaction handler 504 may also clear the transaction. Authorization includes the issuer 502, or the transaction handler 504 on behalf of the issuer 502, authorizing the transaction in connection with the issuer's 502 instructions such as through the use of business rules. The business rules could include instructions or guidelines from the transaction handler 504, the user 510, merchant 508, the acquirer 506, the issuer 502, a financial institution, or combinations thereof. The transaction handler 504 may maintain a log or history of authorized transactions. Once approved, merchant 508 will record the authorization, allowing the user 510 to receive the good or service for the completion of the transaction.

Merchant 508 may, at discrete periods, such as the end of the day, submit a list of authorized transactions to the acquirer 506 or other components of the payment processing system 500. The transaction handler 504 may compare the submitted authorized transaction list with its own log of authorized transactions. If a match is found, the transaction handler 504 may route authorization transaction amount requests from the corresponding acquirer 506 to the corresponding issuer 502 involved in each transaction. Once the acquirer 506 receives the payment of the authorized transaction amount from the issuer 502, it can forward the payment to merchant 508 less any transaction costs, such as fees. If the transaction involves a debit or pre-paid card, the acquirer 506 may choose not to wait for the initial payment prior to paying the merchant 508.

There may be intermittent steps in the foregoing process, some of which may occur simultaneously. For example, the acquirer 506 can initiate the clearing and settling process, which can result in payment to the acquirer 506 for the amount of the transaction. The acquirer 506 may request from the transaction handler 504 that the transaction be cleared and settled. Clearing includes the exchange of financial information between the issuer 502 and the acquirer 506 and settlement includes the exchange of funds. The transaction handler 504 can provide services in connection with settlement of the transaction. The settlement of a transaction includes depositing an amount of the transaction settlement from a settlement house, such as a settlement bank, which the transaction handler 504 typically chooses, into a clearinghouse, such as a clearing bank, that the acquirer 506 typically chooses. The issuer 502 deposits the same from a clearinghouse, such as a clearing bank, which the issuer 502 typically chooses into the settlement house. Thus, a typical transaction involves various entities to request, authorize, and fulfill processing the transaction.

Figure 6:
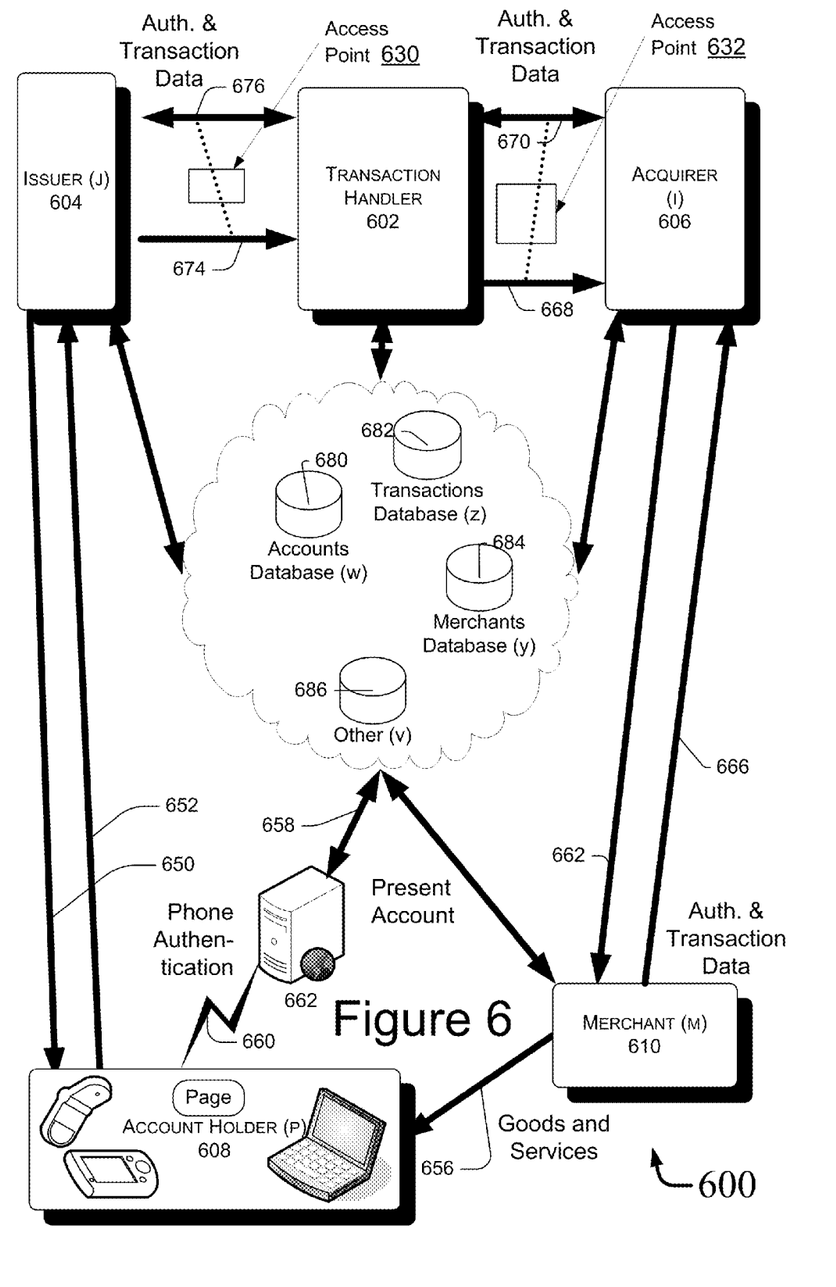

FIG. 6 depicts an exemplary process for the provision of a service by a merchant to a consumer in authorizing and remunerating electronic payment by a account holder (p) 608 in conducting a financial transaction with the merchant (i.e.; a credit card transaction). The diagram of FIG. 6 depicts an exemplary process 600 of a particular financial transaction system which can be used by the foregoing Implementations with respective modifications as described therein. By way of explanation for the nomenclature of reference numerals used in the Figures and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 604, 606, 608, 610, 680, 682, and 684 in FIG. 6 are illustrated with a block, but indicate one or more elements can be present. For example, Issuer (j) 604 is one of a possible plurality of issuers, where j may range from 1 to a large integer.

Account holder (p) 608 communicates 660 an identifier for a mobile consumer transaction payment device to a web service 662 for authentication thereof as described about relative to FIGS. 4-5, which authentication may include communication with an other database (v) 686. Upon such authentication, the Account holder (p) 608 communicates an identifier for an account to a Merchant (m) 610 (at step 658) by use of a mobile payment device that contains the identifier for the account. The communication of the account can be through the hardware, software, and telecommunications mechanisms of web service 662. The account is to be used as tender for a financial transaction with the such as a purchase of goods. Those of skill in the art will recognize that other financial transactions and instruments other than credit cards may also be used, including, but not limited to, a prepaid card and a debit card. For purposes of illustration and explanation, however, reference will be made to a credit card.

As part of the transaction, the Account holder's 608 mobile payment device can be a cellular telephone, a web enabled Personal Digital Assistant (PDA) or other mobile device, etc. The mobile payment device sends information to and from the Merchant (m) 610, whereupon the information for the account is read from the payment device. Merchant (m) 610 then sends a request for authorization to the Merchant's 610 Acquirer (i) 606 (at step 662). Each Acquirer (i) 606 is a financial organization that processes credit card transactions for businesses, for example merchants, and is licensed as a member of a transaction handler (TH) 602 such as a credit card association (i.e., Visa Inc., MasterCard, etc.) As such, each Acquirer (i) 606 establishes a financial relationship with one or more Merchants (n) 610.

The Acquirer (i) 606 transmits the account information to the TH 602 (at step 670), who in turn routes the request to the account holder's issuing bank, or Issuer (j) 604 (at step 676). The Issuer (j) 604 returns authorization information to the TH 602 (at step 674) who returns the information to the Merchant (m) 610 through the Acquirer (i) 606 (by steps 668 and 666). The Merchant (m) 610 now knowing whether the Issuer's (j) 604 credit card account is valid and supports a sufficient credit balance, may complete the transaction and the Account holder (p) 608 in turn receives goods and/or services in exchange (at step 656). Most credit card associations instruct merchants that, after receiving authorization, the detailed credit card account information obtained from the point of sale magnetic stripe scanner must be deleted.

To reconcile the financial transactions and provide for remuneration, information about the transaction is provided by the Merchant (m) 610 to Acquirer (i) 606 (at step 662), who in turn routes the transaction data to the TH 602 (at step 670) who then provides the transaction data to the appropriate Issuer (j) 604 (at step 676). The Issuer (j) 604 then provides funding for the transaction to the TH 602 (at step 674) through a settlement bank (not shown). The funds are then forwarded to the Merchant's (n) 610 Acquirer (i) 606 (at step 668) who in turn pays the Merchant (m) 610 for the transaction conducted at step 662 less a merchant discount, if applicable. The Issuer (j) 604, then bills the Account holder (p) 608 (at step 650), and the Account holder (p) 608 pays the Issuer 604 (at step 652), with possible interest or fees.

Each of the Issuer (j) 604, Merchants (n) 610, Acquirer (i) 606 and the TH 602 may have access to information resources having one or more of the following databases: transaction database (z) 682, merchant database (y) 684, or account database (w) 680. These databases can be connected by a network, internet, virtual private network, or by other means known to those skilled in the art. Moreover, not every participant must necessarily have access to any or all of the databases. Each database can assign read, write, and query permissions as appropriate to the various participants. For example, a Merchant (m) 610 have read access to the account database (w) 680 and the Issuer (j) may have read and write access.

The transaction database (z) 682 is designed to store some or all of the transaction data originating at the Merchants (n) 610 that use a payment device for each transaction conducted between an Account holder (p) 608 and the Merchant (m) 610. The transaction data can include information associated with the account of an Account holder (p) 608, date, time, and location among other more specific information including the amount of the transaction. The database can be searched using account information, date and time (or within proximity thereof), or by any other field stored in the database.

The Merchant database (y) 684 is designed to store information about each Merchant (m) 610. The Merchant database (y) can contain information such as the unique identification of each Merchant (n) 810, an identifier for each point of sale device in use by the Merchant (m) 610, and location of the Merchant (m) 610.

The account database (w) 680 is designed to store account information for payment devices associated with Account holder (p). The account database (w) 660 can store part or all of an account number, unique encryption key, account information, account name. The information from the account database (w) 680 can be associated with information from the transaction database (z) 682.

An Account holder (p) 608 initiates a transaction with a Merchant (m) 610 by presenting a payment device at step 658 to the Merchant (m) 610. The payment device is typically presented at the Point Of Service terminal (POS) at which data thereon is read. Certain transaction information is transmitted from the POS in route to the Merchant's (n) 610 Acquirer (i) 606. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (m) 610, and the ultimate destination, such as the Acquirer (i) 606. These points can include, without limitation, from the reader at the POS, the POS at the Merchant (m) 610 and a network router or computer that is connected to a network but is housed and maintained by the Merchant (m) 610 and between the Merchant (m) 610 and the Acquirer (i) 606. The communication channel could be Ethernet, wireless internet, satellite, infrared transmission, or other known communication protocols. Some or all of the transmission may also be stored for record keeping, archival or data mining purposes with little or no encryption. For example, the Merchant (m) 610 may store transaction data, including certain account information in the Merchant's (n) 610 accounts on file database for reuse later.

In this process, transaction information is retrieved from the POS at a Merchant (m) 610. The transaction information is comprised of account information together with other information about the transaction itself: time, date, location, value, etc. Certain of the transaction information is considered sensitive information including, without limitation, account number, credit card verification number, and account name.

In FIGS. 3 and 5-6 illustrates exemplary telecommunications networks that each may make use of any suitable telecommunications network and may involve different hardware, different software and/or different protocols then those discussed below. These global telecommunications networks supports purchase and cash transactions using any bankcard, travel and entertainment cards, and other private label and proprietary cards. The network also supports ATM transactions for other networks, transactions using paper checks, transactions using smart cards and transactions using other financial instruments.

These transactions are processed through the network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice-the first time with only information needed for an authorization decision, an again later with additional information for clearing and settlement. A single message transaction is sent once for authorization and contains clearing and settlement information as well. Typically, authorization, clearing and settlement all occur on-line.

FIGS. 5-6 include one or more transaction handlers 504, 602, access points 630, 632, acquirers 506, 606, and issuers 502, 606. Other entities such as drawee banks and third party authorizing agents may also connect to the network through an access point. An interchange center is a data processing center that may be located anywhere in the world. In one embodiment, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, the communication lines that connect an interchange center (transaction handlers 504, 602) to remote entities use dedicated high-bandwidth telephone circuits or satellite connections based on the IBM SNA-LU0 communication protocol. Messages are sent over these lines using any suitable implementation of the ISO 8583 standard.

Access points 630, 632 are typically made up of small computer systems located at a processing center that interfaces between the center's host computer and the interchange center The access point facilitates the transmission of messages and files between the host and the interchange center supporting the authorization, clearing and settlement of transaction. Telecommunication links between the acquirer (q) 606 and its access point, and between the access point and issuer (i) 604 are typically local links within a center and use a proprietary message format as preferred by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Various terms may be used herein, which are to be understood according to the following descriptions 1 through 8:

1. Acceptance point device includes a device capable of communicating with a payment device, where the acceptance point device can include a Point of Device (POS) device, a smartcard, a payment card such as a credit or debit card with a magnetic strip and without a microprocessor, a keychain device such as the SPEEDPASS® commercially available from ExxonMobil® Corporation, a cellular telephone, personal digital assistant (PDA), a pager, a security card, an access card, a smart media, a transponder, personal computer (PC), tablet PC, handheld specialized reader, set-top box, electronic cash register (ECR), automated teller machine (ATM), virtual cash register (VCR), kiosk, security system, or access system;

2. Account holder or user includes any person or entity with an account and/or a payment device associated with an account, where the account is within a payment system;

3. Issuer includes any entity that issues one or more accounts and/or payment devices;

4. Merchant includes any entity that supports an acceptance point device;

5. Participant includes any user, person, entity, charitable organization, machine, hardware, software, merchant or business who accesses and uses the system of the invention, such as any consumer (such as primary member and supplementary member of an aggregate consumer account), retailer, manufacturer, and third-party provider, and any subset, group or combination thereof;

6. Redemption includes obtaining a reward using any portion of points, coupons, cash, foreign currency, gift, negotiable instruments, or securities;

7. Reward includes any discount, credit, good, service, package, event, experience (such as wine tasting, dining, travel), or any other item; and 8. Payment device includes a card, smartcard, ordinary credit or debit cards (with a magnetic strip and without a microprocessor), a keychain device (such as the SPEEDPASS™ commercially available from Exxon-Mobil Corporation), cellular telephone, personal digital assistant (PDA), pager, payment card, security card, access card, smart media, or transponder, where each payment device can include a loyalty module with a computer chip with dedicated hardware, software, embedded software, or any combination thereof that is used to perform actions associated with a loyalty program.

The limited to the particular methodologies or protocols described herein, as these may vary. It is also to be understood that the terminology used herein is for the purpose of describing particular embodiments only, and is not intended to limit the scope of the present disclosure, which will be limited only by the appended claims.

It must be noted that as used herein and in the appended claims, the singular forms "a," "an," and "the" include plural reference unless the context clearly dictates otherwise. Thus, for example, reference to a "transaction" is a reference to one or more transactions and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed implementations is provided to enable any person of ordinary skill in the art to make or use the disclosure. Various modifications to these implementations will be readily apparent to those of ordinary skill in the art, and the generic principles defined herein may be applied to other implementations without departing from the spirit or scope of the disclosure. Thus, the disclosure is not intended to be limited to the implementations shown herein but is to be accorded the widest scope consistent with the principles and novel features disclosed herein.

What is claimed is:

1. A method comprising:

performing the following software steps by a computer, the steps including:

receiving, incident to a transaction being conducted by a merchant upon an account of an account holder, a logical address of a computing device having a display with display attributes that is being used to conduct the transaction, and a mobile transaction flag, wherein the logical address of the computing device is extracted from a message header of a message from the computing device and identified as a cellular telephone number by a merchant purchase interface;

obtaining the display attributes of the display of the computing device by accessing, using at least the logical address of the computing device, a database associated with an authentication service;

formatting an authentication request using the obtained display attributes of the computing device;

sending the formatted authentication request for delivery to the logical address of the computing device;

receiving, from the logical address of the computing device and in response to the formatted authentication request, authentication information for the account holder;

performing a validation attempt on the received authentication information for the account holder; and if the received authentication information for the account holder was successfully validated by the performance of the validation attempt, transmitting an authentication response for delivery to a logical address for the merchant, wherein:

if the received authentication information for the account holder was successfully validated by the performance of the validation attempt, the steps further comprise digitally signing the authentication response to the authentication request for the authentication information for the account holder, wherein the authentication response that is transmitted for delivery to the logical address of the merchant is the digitally signed authentication response; and the step of receiving the logical address of the computing device is performed by receipt of one or more transmissions over the internet.

2. The method as defined in claim 1, wherein the steps further comprise:

receiving a transmission containing information confirming authorization of the transaction by the issuer of the account;

formatting a message, using the obtained display attributes of the computing device, containing the information confirming the authorization of the transaction by the issuer of the account; and transmitting the formatted message for delivery to the logical address of the computing device.

3. The method as defined in claim 1, wherein:

the transaction is one of a plurality of transactions in a transaction payment processing system; and each said transaction in the payment processing system is processed by:

the merchant of the transaction sending an authorization request for the transaction being conducted on the account to an acquirer for the merchant of the transaction;

the acquirer sending the authorization request to a transaction handler;

the transaction handler sending the authorization request to the issuer of the account upon which the transaction is being conducted; the issuer sending, in response to the authorization request, an authorization response to the transaction handler; the transaction handler sending the authorization response to the acquirer for the merchant; and the merchant completing the transaction with the account holder after receiving the authorization response for the transaction from the acquirer.

4. The method as defined in claim 3, wherein: communications between the transaction handler, the issuer and the acquirer are performed via transmissions to a dedicated network; and each said receiving step is performed via one or more transmissions over the internet.

5. A method comprising:
performing the following software steps by a computer, the steps including:
receiving from a logical address of a merchant, incident to an e-commerce transaction being conducted by the merchant upon an account of an account holder, a logical address of a web enabled mobile computing device having a display and being used to conduct the e-commerce transaction, and further receiving a mobile transaction flag, wherein the logical address of the web enabled mobile computing device is extracted from a message header of a message from the web enabled mobile computing device and identified as a cellular telephone number by a merchant purchase interface;
obtaining display attributes of the display of the web enabled mobile computing device by accessing a display attributes database with the logical address of the web enabled mobile computing device;
formatting an authentication request using the obtained display attributes of the web enabled mobile computing device;
transmitting the formatted authentication request for delivery to the logical address of the web enabled mobile computing device;
receiving, from the logical address of the web enabled mobile computing device and in response to the transmitted formatted authentication request, authentication information for the account holder;
performing a validation attempt on the received authentication information for the account holder; and
if the received authentication information for the account holder was successfully validated by the performance of the validation attempt: digitally signing an authentication response; and transmitting the digitally signed authentication response for delivery to the logical address of the merchant, whereby the merchant can send an authorization request for the transaction being conducted on the account to an acquirer for the merchant that identifies the received authentication information for the account holder as being successfully validated,
wherein: the logical address of the web enabled mobile computing device is the cellular telephone number; and the step of receiving the logical address of the web enabled mobile computing device is performed by receipt of one or more transmissions over the internet.

6. The method as defined in claim 5, wherein the steps further comprise:
receiving a transmission containing information confirming authorization of the transaction by the issuer of the account; formatting a message using the obtained display attributes of the web enabled mobile computing device and containing data representing the confirmation of the authorization of the transaction by the issuer of the account; and
transmitting the formatted message for delivery to the logical address of the web enabled mobile computing device.

7. The method as defined in claim 5, wherein:
the transaction is one of a plurality of transactions in a transaction payment processing system; and each of the plurality of transactions in the payment processing system is processed by:
the merchant of the transaction sending an authorization request for the transaction being conducted on the account to an acquirer for the merchant of the transaction;
the acquirer sending the authorization request to a transaction handler;
the transaction handler sending the authorization request to the issuer of the account upon which the transaction is being conducted;
the issuer sending, in response to the authorization request, an authorization response to the transaction handler;
the transaction handler sending the authorization response to the acquirer for the merchant; and
the merchant completing the transaction with the account holder after receiving the authorization for the transaction from the acquirer.

8. The method as defined in claim 7, wherein:
communications between the transaction handler, the issuer and the acquirer are performed via transmissions to a dedicated network; and the step of the receiving, the step of the obtaining, and the step of the sending are performed via one or more transmissions over the internet.

9. A method comprising:
performing the following software steps by a computer, the steps including:
receiving, at one of a plurality of network devices on a network, from a logical address of an e-commerce website of a merchant, incident to an e-commerce transaction being conducted by the merchant upon an account of an account holder: a telephone number of a web enabled cellular telephone having a display with display attributes that is being used to conduct the e-commerce transaction wherein the telephone number is extracted from a message header of a message from the web enabled cellular telephone and identified as a cellular telephone number by a merchant purchase interface; and an enrollment verification request;
verifying, in response to the enrollment verification request, that the account and the web enabled cellular telephone are both enrolled in an authentication service;
transmitting, for delivery to the logical address of the e-commerce website of the merchant, a verification that the account and the web enabled cellular telephone are both enrolled in the authentication service;
receiving, in response to the verification that the account and the web enabled cellular telephone are both enrolled in the authentication service, at one of the plurality of network devices on the network: the telephone number of the web enabled cellular telephone; an identifier for the merchant; a total currency amount for the transaction; and an identifier for the account;
obtaining the display attributes of the display of the web enabled cellular telephone by accessing a display attributes database using at least the telephone number of the web enabled cellular telephone;

formatting an authentication request using the obtained display attributes of the display of the web enabled cellular telephone;

transmitting, for delivery to the telephone number of the web enabled cellular telephone, the formatted authentication request that includes: the identifier for the merchant; the total currency amount of the transaction; and the identifier for the account;

receiving, from the telephone number of the web enabled cellular telephone and in response to the formatted authentication request, at one of the plurality of network devices on the network, authentication information for the account holder that includes an access code;

performing, using at least the access code, a validation attempt on the received authentication information for the account holder; and if the received authentication information for the account holder was successfully validated by the performance of the validation attempt:

digitally signing an authentication response; and transmitting, from one of the plurality of network devices on the network, the digitally signed authentication response for delivery to the logical address of the e-commerce website of the merchant, whereby an authorization request for the transaction being conducted on the account can be sent to an acquirer for the merchant that identifies the received authentication information for the account holder as being successfully validated.

10. The method as defined in claim 9, wherein the display attributes of the display of the web enabled cellular telephone comprise a mark-up language and a character set supported by the web enabled cellular telephone.

11. The method as defined in claim 9, wherein the steps further comprise:

receiving, at one of the plurality of network devices on the network, a transmission containing information confirming the authorization of the transaction by the issuer of the account;

formatting a message using the obtained display attributes of the web enabled mobile computing device and containing data representing the confirmation of the authorization of the transaction by the issuer of the account; and transmitting, from one of the plurality of network devices on the network, the formatted message for delivery to the logical address of the web enabled mobile computing device.

12. The method as defined in claim 9, wherein:

the transaction is one of a plurality of transactions in a transaction payment processing system; and each of the plurality of transactions in the payment processing system is processed by:

the merchant of the transaction sending an authorization request for the transaction being conducted on the account to an acquirer for the merchant of the transaction; the acquirer sending the authorization request to a transaction handler; the transaction handler sending the authorization request to the issuer of the account upon which the transaction is being conducted; the issuer sending, in response to the authorization request, an authorization response to the transaction handler; the transaction handler sending the authorization response to the acquirer for the merchant; and the merchant completing the transaction with the account holder after receiving the authorization for the transaction from the acquirer.

13. The method as defined in claim 9, wherein: communications between the transaction handler, the issuer and the acquirer are performed via transmissions a dedicated network; and each said step of receiving and each said step of transmitting is performed via one or more transmissions over the internet.

14. The method of claim 1, wherein receiving the logical address of the computing device, and obtaining the display attributes of the display of the computing device by accessing, using at least the logical address of the computing device is performed by a mobile authentication component.

15. The method of claim 14, wherein the mobile authentication component is in communication with an access control server and the computing device.

* * * * *

UNITED STATES PATENT AND TRADEMARK OFFICE
CERTIFICATE OF CORRECTION

| | | |
|---|---|---|
| PATENT NO. | : 8,639,600 B2 | Page 1 of 1 |
| APPLICATION NO. | : 12/538649 | |
| DATED | : January 28, 2014 | |
| INVENTOR(S) | : Lee | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 710 days.

Signed and Sealed this
Eleventh Day of August, 2015

Michelle K. Lee
*Director of the United States Patent and Trademark Office*